United States Patent
Hanashima et al.

(10) Patent No.: US 7,027,702 B2
(45) Date of Patent: Apr. 11, 2006

(54) OPTICAL WAVEGUIDE

(75) Inventors: Naoki Hanashima, Chuo-ku (JP); Reio Mochida, Chuo-ku (JP)

(73) Assignee: TDK Corporation, Tokyo (JP)

( * ) Notice: Subject to any disclaimer, the term of this patent is extended or adjusted under 35 U.S.C. 154(b) by 162 days.

(21) Appl. No.: 10/771,365

(22) Filed: Feb. 5, 2004

(65) Prior Publication Data

US 2005/0013574 A1 Jan. 20, 2005

(30) Foreign Application Priority Data

Feb. 17, 2003 (JP) ............................. 2003-037893

(51) Int. Cl.
*G02B 6/10* (2006.01)

(52) U.S. Cl. ..................... 385/129; 385/131; 385/130

(58) Field of Classification Search ................ None
See application file for complete search history.

(56) References Cited

U.S. PATENT DOCUMENTS

| | | | | |
|---|---|---|---|---|
| 5,483,613 A | * | 1/1996 | Bruce et al. | 385/129 |
| 6,396,988 B1 | * | 5/2002 | Shimoda | 385/129 |
| 6,580,864 B1 | * | 6/2003 | Temkin et al. | 385/132 |
| 6,625,370 B1 | * | 9/2003 | Itoh et al. | 385/132 |
| 6,678,454 B1 | * | 1/2004 | Klekamp et al. | 385/132 |
| 6,690,872 B1 | * | 2/2004 | Sasaki et al. | 385/132 |
| 2005/0053348 A1 | * | 3/2005 | Tatehata et al. | 385/129 |
| 2005/0094957 A1 | * | 5/2005 | Takahashi | 385/129 |
| 2005/0163445 A1 | * | 7/2005 | Hanashima et al. | 385/129 |

FOREIGN PATENT DOCUMENTS

| JP | A 1-169406 | 7/1989 |
|---|---|---|
| JP | A 5-257021 | 10/1993 |
| JP | A 11-174246 | 7/1999 |

* cited by examiner

*Primary Examiner*—John D. Lee
*Assistant Examiner*—Kevin S. Wood
(74) *Attorney, Agent, or Firm*—Oliff & Berridge, PLC

(57) ABSTRACT

An optical waveguide having low polarization dependence having a lower clad layer formed on a substrate, a core layer formed on the lower clad layer and an upper clad layer in which the core layer is buried. The core layer and the upper clad layer of the optical waveguide are made of a material comprising glass as a major component. The polarization dependence is lowered by optimizing the relationship between the coefficients of linear expansion softening temperatures of the optical waveguide layers.

4 Claims, 3 Drawing Sheets

OPTICAL WAVEGUIDE

BACKGROUND OF THE INVENTION

1. Field of the Invention

This invention relates to a glass-based optical waveguide.

2. Description of the Related Art

An optical waveguide having a core layer and a clad layer formed on a substrate is manufactured by a thin-film technology or a fine processing technology similar to a semiconductor process, and is drawing attention as a principal component in a high-speed optical fiber network. Since the glass-based optical waveguide has low loss and is easy to manufacture, the waveguide is occupying a majority proportion of the optical waveguide devices which have been placed in the market as products.

An optical fiber is connected to an input terminal of the optical waveguide. The state of polarization of input light from the optical fiber is indefinite. Therefore, it is desired that the characteristics of the optical waveguide do not vary depending upon the state of polarization of the input light. The polarization dependence of the optical waveguide is caused by the birefringence. The birefringence stems from the internal stress built up in the core layer and the clad layer, and is particularly greatly affected by thermal stress stemming from differences in the coefficients of linear expansion of the layers. In a process for manufacturing a silica waveguide, in general, the heat treatment is conducted after film formation in order to decrease the insertion loss of the manufactured optical waveguide. In a step in which the temperature is lowering after the heat treatment, the thermal stress occurs from a difference in the coefficients of linear expansion among the core layer, the clad layer and the substrate. When a difference in the thermal stress occurs between the in-plane direction of the substrate and the direction perpendicular thereto near the optical waveguide, the birefringence occurs in the optical waveguide due to photoelastic effect.

In order to solve the above problem, there have been proposed, for example, a method of equalizing the coefficients of linear expansion of the core layer and the clad layer on the interface between the layers (see JP-A-1-169406), a method of equalizing the coefficients of linear expansion of the upper clad layer and the substrate (see JP-A-11-174246), and a method of optimizing the amount of dopant such that the coefficients of linear expansion of the clad layer and the core layer are equalized (see JP-A-5-257021). Even by employing the above known methods of equalizing the coefficients of linear expansion of layers on the interface between the layers, however, it is not still possible to obtain an optical waveguide which has sufficient polarization independence.

SUMMARY OF THE INVENTION

It is an object of the present invention to provide an optical waveguide which has low PDL (polarization dependent loss).

The above object is achieved by an optical waveguide comprising a lower clad layer formed on a substrate, a core layer formed on the lower clad layer and an upper clad layer in which the core layer is buried, at least the core layer and the upper clad layer being made of a material comprising a glass as a major component, wherein a coefficient of linear expansion of the core layer is denoted by $\alpha_{core}$, a difference between a softening temperature $T_{core}$ of the core layer and a practically used temperature $T_o$ by $\Delta T_{core}$, a coefficient of linear expansion of the upper clad layer by $\alpha_{clad}$, a difference between a softening temperature $T_{clad}$ of the upper clad layer and the practically used temperature $T_o$ by $\Delta T_{clad}$, and a coefficient of effective linear expansion of the substrate and of the lower clad layer by $\alpha_{subs}$, then, a relationship, $$\frac{\Delta T_{core}}{\Delta T_{clad}} = \frac{2\alpha_{core} - \alpha_{subs} - \alpha_{clad}}{\alpha_{core} - \alpha_{subs}}$$

is satisfied.

The optical waveguide of the invention further has a relationship $\Delta T_{core} > \Delta T_{clad}$.

The optical waveguide of the invention further has a relationship, $$\frac{2\alpha_{core} - \alpha_{subs} - \alpha_{clad}}{\alpha_{core} - \alpha_{subs}} > 1$$

The above object is achieved by an optical waveguide comprising a lower clad layer formed on a substrate, a core layer formed on the lower clad layer and an upper clad layer in which the core layer is buried, at least the core layer and the upper clad layer being made of a material comprising a glass as a major component, wherein a coefficient of linear expansion of the core layer is denoted by $\alpha_{core}$, a coefficient of linear expansion of the upper clad layer by $\alpha_{clad}$, and a coefficient of effective linear expansion of the substrate and of the lower clad layer by $\alpha_{subs}$, then, there holds a relationship $\alpha_{core} \neq \alpha_{clad} \neq \alpha_{subs}$, and a difference $\Delta n$ between the refractive index of the core layer and the refractive index of the upper clad layer in a direction in parallel with the surface of the substrate is denoted by $\Delta n_x$ and a difference of refractive index in a direction perpendicular to the surface of the substrate is denoted by $\Delta n_y$, then, there holds a relationship $\Delta n_x = \Delta n_y$.

DESCRIPTION OF THE PREFERRED EMBODIMENTS

Figure 1A:
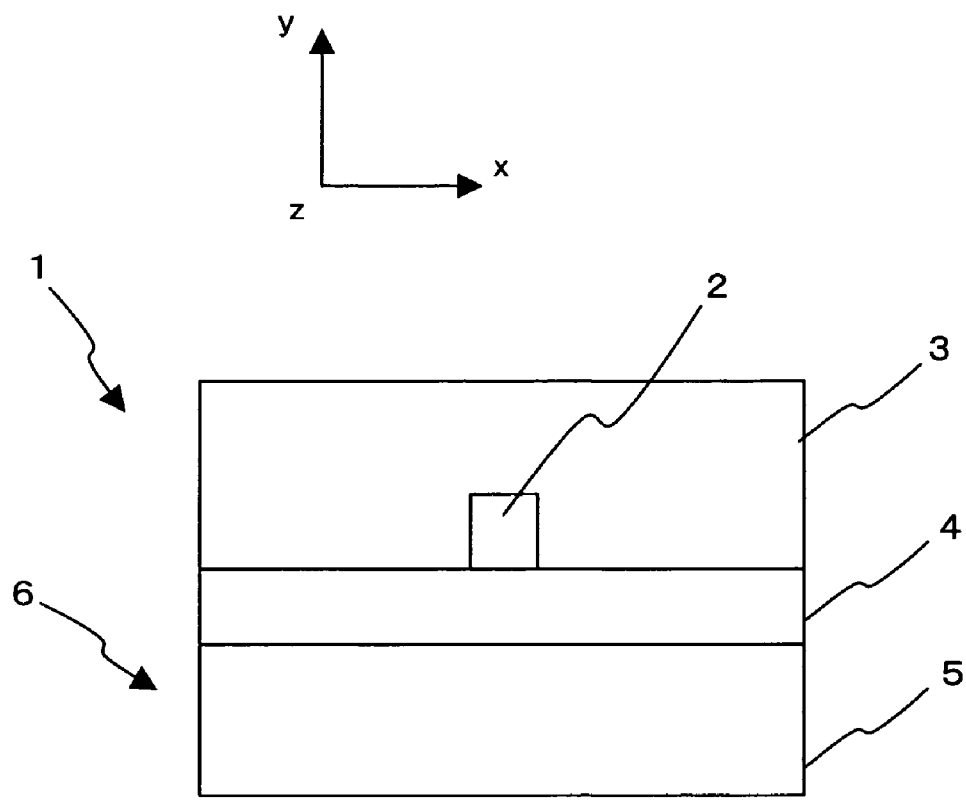
FIGS. 1A and 1B are sectional views of an optical waveguide according to an embodiment of the present invention.

An optical waveguide according to an embodiment of the invention will now be described. When the coefficients of linear expansion of the core layer, the upper clad layer and the substrate are equal, internal stress does not accumulate near the optical waveguide with fluctuations in temperature due to heat treatment even if the core layer, the upper clad layer and the substrate have different softening temperatures respectively. The present inventors have discovered the fact that the polarization dependence which is affected by the core-cladding index differences than the refraction index itself of the core layer, or the like does not occur in the optical waveguide if the internal stresses occurring in the vicinity of the waveguide are isotropic. In order for the internal stress near the optical waveguide to become isotropic, a relationship of coefficients of linear expansion of the core layer, the upper clad layer and the substrate should be optimized.

As for the thermal strain due to thermal expansion of the material comprising a glass as a major component, consideration must be given to the softening of a material accompanying a rise in the temperature. The viscosity of the glass drastically changes depending upon the temperature. Therefore, the state of the glass is sectionalized depending upon several characteristic temperatures. At a softening temperature Ts which is one of the characteristic temperatures at which the softening starts, the coefficient of viscosity becomes $10^{7.6}$ poises, and the viscous flow occurs in the glass. In this case, no thermal strain accumulates in the glass, and the thermal stress becomes very small at temperatures higher than the softening temperature Ts. A material comprising a glass as a major component is used for the core layer and the clad layer of the optical waveguide. Therefore, very small thermal stress occurs in the core layer and in the clad layer at temperatures higher than the softening temperature Ts. Being affected by the cooling profile in the step of heat treatment at the time of manufacturing the optical waveguide, however, the thermal stress gradually increases in the core layer and in the clad layer as the temperature approaches the practically used temperature from the softening temperature Ts. Finally, thermal stress that has occurred at temperatures lower than the softening temperature Ts remains in the core layer and in the clad layer.

In order that the core layer can be buried in the upper clad layer, in general, the upper clad layer is made of a material having a softening temperature Ts lower than that of the core layer. On the internal stress accumulated near the optical waveguide, the component in a direction in parallel with the surface of the substrate varies depending upon the thermal stress occurring between the substrate and the core layer, and the component in a direction perpendicular to the surface of the substrate varies depending upon the thermal stress occurring between the clad layer and the core layer. In a step in which the temperature of the heat treatment is lowering, the thermal stress occurring between the substrate and the core layer accumulates at temperatures lower than the softening temperature of the substrate or of the core layer whichever is lower. The thermal stress occurring between the clad layer and the core layer accumulates at temperatures lower than the softening temperature of the clad layer or of the core layer whichever is lower. Therefore, when the softening temperatures are not the same, the thermal stress becomes no longer isotropic even when the difference in the coefficients of linear expansion of the core layer and the substrate is the same as the difference in the coefficients of linear expansion of the core layer and the clad layer.

The softening characteristics of the silica glass vary depending upon the amount of dopant that is used for controlling the coefficient of linear expansion and the refractive index. In order to decrease the difference in the thermal stresses in the in-plane direction of the substrate and in the direction perpendicular thereto so that birefringence will not occur in the optical waveguide, therefore, consideration must be given to the softening characteristics of the core layer and the clad layer as well as to the kind and amount of the dopant that affects the softening characteristics in addition to the coefficients of linear expansion.

Figure 1B:
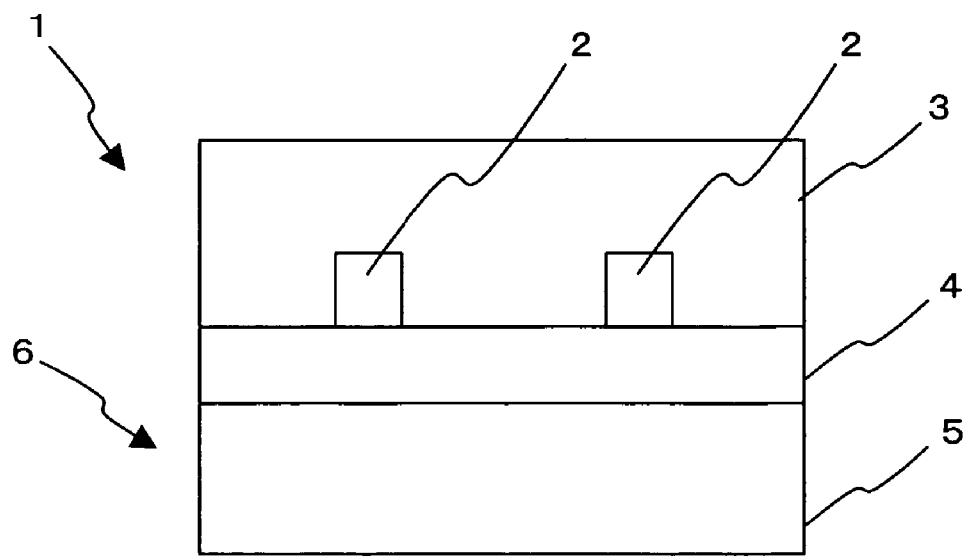

FIG. 1A is a sectional view illustrating an optical waveguide 1 according to the embodiment that is cut perpendicularly to the surface of the substrate and to the direction of optical waveguide. The optical waveguide 1 has a lower clad layer 4 formed on a substrate 5 made of silica glass or the like material, and a core layer 2 of nearly a rectangular shape in cross section formed on the lower clad layer 4. The optical waveguide 1 further has an upper clad layer 3 deposited on the core layer 2 and on the lower clad layer 4. The core layer 2, upper clad layer 3 and lower clad layer 4 are made of a material comprising a glass as a major component. Hereinafter, the lower clad layer 4 and the substrate 5 are totally referred to as a composite substrate 6. In FIGS. 1A and 1B, the right-and-left direction on the surface of the paper on the in-plane of the composite substrate 6 is referred to as the x-direction, the direction perpendicular to the surface of the paper is referred to as the z-direction, and the direction of normal to the surface of the composite substrate 6 is referred to as the y-direction.

The formulas (1-1) to (1-4) appearing below represent thermal stresses occurring in the core layer 2 and in the upper clad layer 3. The formula (1-1) represents the magnitude of thermal stress $\sigma_{x\_core}$ occurring in the core layer 2 in the x-direction when the temperature has changed by $\Delta T_{core}$ due to a difference (difference in the coefficient of linear expansion) between the coefficient $\alpha_{core}$ of linear expansion of the core layer 2 and the coefficient $\alpha_{subs}$ of linear expansion of the composite substrate 6. Here, the change $\Delta T_{core}$ in the temperature is a difference between the softening temperature $T_{core}$ of the core layer 2 and the practically used temperature $T_o$ of the optical waveguide. Further, the change $\Delta T$ in the temperature is the softening temperature of the core layer 2 or of the composite substrate 6 whichever is lower. In general, the softening temperature $T_{core}$ of the core layer 2 is lower than the softening temperature $T_{subs}$ of the composite substrate 6 and, hence, the formula (1-1) employs the temperature change $\Delta T_{core}$. In this formula, E is a Young's modulus and ν is a Poisson's ratio. The coefficient $\alpha_{subs}$ of linear expansion of the composite substrate 6 is an effective value estimated from relationships among the magnitude of thermal expansion of the composite substrate consisting of the lower clad layer 4 and the substrate 5, ratio of thickness of the substrate constituting the composite substrate and of the laminated film, Young's modulus and Poisson's ratio.

The formula (1-2) represents the magnitude of thermal stress $\sigma_{y\_core}$ occurring in the core layer 2 in the y-direction when the temperature has changed by $\Delta T_{clad}$ due to a difference between the coefficient $\alpha_{core}$ of linear expansion of the core layer 2 and the coefficient $\alpha_{clad}$ of linear expansion of the upper clad layer 3. Here, the softening temperature $T_{clad}$ of the upper clad layer 3 is lower than the softening temperature $T_{core}$ of the core layer 2 and, hence, the formula (1-2) employs the temperature change $\Delta T_{clad}$.

Similarly, the formula (1-3) represents the magnitude of thermal stress $\sigma_{x\_clad}$ occurring in the upper clad layer 3 in the x-direction when the temperature has changed by $\Delta T_{clad}$ due to a difference between the coefficient $\alpha_{clad}$ of linear expansion of the upper clad layer 3 and the coefficient $\alpha_{subs}$ of linear expansion of the composite substrate 6. Here, the softening temperature $T_{clad}$ of the upper clad layer 3 is lower than the softening temperature $T_{subs}$ of the composite substrate 6 and, hence, the formula (1-3) employs the temperature change $\Delta T_{clad}$.

Similarly, the formula (1-4) represents the magnitude of thermal stress $\sigma_{y\_clad}$ occurring in the upper clad layer 3 in the y-direction when the temperature has changed by $\Delta T_{clad}$ due to a difference between the coefficient $\alpha_{clad}$ of linear expansion of the upper clad layer 3 and the coefficient $\alpha_{core}$ of linear expansion of the core layer 2.

In addition to the formulas (1-1) to (1-4), there exists the thermal stress $\sigma_{x\_clad}$ occurring in the upper clad layer 3 in the x-direction when the temperature has changed by $\Delta T_{clad}$ due to a difference between the coefficient $\alpha_{clad}$ of linear expansion of the upper clad layer 3 and the coefficient $\alpha_{core}$ of linear expansion of the core layer 2, which, however, is not necessary in the subsequent description of the embodiment, and the formula thereof is omitted.

$$\sigma_{x\_core} = \frac{E}{1-\nu}(\alpha_{core} - \alpha_{subs})\Delta T_{core} \tag{1-1}$$

$$\sigma_{y\_core} = \frac{E}{1-\nu}(\alpha_{core} - \alpha_{clad})\Delta T_{clad} \tag{1-2}$$

$$\sigma_{x\_clad} = \frac{E}{1-\nu}(\alpha_{clad} - \alpha_{subs})\Delta T_{clad} \tag{1-3}$$

$$\sigma_{y\_clad} = \frac{E}{1-\nu}(\alpha_{clad} - \alpha_{core})\Delta T_{clad} \tag{1-4}$$

Here, though not specifically illustrated, considered below is a general structure of waveguide comprising a core and a surrounding clad. Propagation characteristics of an optical waveguide is characterized by an effective refractive index $n_{eff}$ of the propagation mode. The effective refractive index $n_{eff}$ is obtained by solving eigenvalue equations by using the refractive index $n_{core}$ of the core and the refractive index $n_{clad}$ of the clad, and is expressed by the formula (2-2) by using the formula (2-1) which represents a standardized refractive index b. In the formulas (2-1) and (2-2), the difference $\Delta n$ in the refractive index is a difference ($\Delta n = n_{core} - n_{clad}$) between the refractive index $n_{core}$ of the core and the refractive index $n_{clad}$ of the clad.

$$b = \frac{n_{eff}^2 - n_{clad}^2}{n_{core}^2 - n_{clad}^2} \cong \frac{n_{eff} - n_{clad}}{n_{core} - n_{clad}} \tag{2-1}$$

$$= \frac{n_{eff} - n_{clad}}{\Delta n}$$

$$n_{eff} = \Delta n b + n_{clad} \tag{2-2}$$

The first term of the right-hand side of the formula (2-2) representing the effective refractive index $n_{eff}$ contains the difference $\Delta n$ in the refractive index but the second term of the right-hand side does not contain the difference $\Delta n$ in the refractive index. That is, the first term of the right-hand side of the formula (2-2) representing the effective refractive index $n_{eff}$ is mainly related to an optical confine inside the waveguide among the propagation characteristics, and the second term of the right-hand side is related to an optical distance.

Characteristics of the optical waveguide device including an interference system such as Mach-Zehnder constitution or array waveguide constitution vary depending upon how precisely the difference in the length of a plurality of optical paths constituting the interference system can be set. In order to lower the polarization dependence of the optical waveguide device including the interference system, it is necessary that the birefringence does not occur in the refractive index $n_{clad}$ of the clad (or in the refractive index $n_{core}$ of the core) itself represented by the second term of the formula (2-2).

Characteristics of the waveguide without including interference system, such as directional coupler or power splitter, on the other hand, are little affected by a change of difference in the lengths of the optical paths, but are greatly affected by a state of optical confine. The state of optical confine varies depending upon $\Delta n$ which is a difference between the refractive index $n_{core}$ of the core and the refractive index $n_{clad}$ of the clad. To decrease the polarization dependence of the optical waveguide without including interference system, therefore, consideration should be given to the difference $\Delta n$ in the refractive index between the core and the clad instead of the refractive indexes of the core and the clad. Further, the polarization dependence of the optical waveguide circuit without including interference system, in many cases, occurs in the optical waveguide including portions where a plurality of core layers 2, 2' are neighboring to one another as illustrated in FIG. 1B. In such a case, a change of optical confinement at the sides of the core becomes more conspicuous than a change of optical confinement over and under the cores. In this embodiment, therefore, the refractive indexes of the upper and lower clad layers 3 and 4 are represented by the refractive index $n_{clad}$ of the upper clad layer 3.

$$\varepsilon_x = \frac{1}{E}(\sigma_x - \nu(\sigma_y + \sigma_z)) \tag{3-1}$$

$$= \frac{1}{E}[\sigma_x(1-\nu) - \nu\sigma_y]$$

$$\varepsilon_y = \frac{1}{E}(\sigma_y - \nu(\sigma_x + \sigma_z)) \tag{3-2}$$

$$= \frac{1}{E}[-2\nu\sigma_x + \sigma_y]$$

$$\varepsilon_z = \frac{1}{E}(\sigma_z - \nu(\sigma_x + \sigma_y)) \tag{3-3}$$

$$= \frac{1}{E}[\sigma_x(1-\nu) - \nu\sigma_y]$$

In general, a relationship between the stress $\sigma$ and the strain $\epsilon$ occurring in a material body can be represented by the formulas (3-1) to (3-3). In the formulas (3-1) to (3-3), ($\epsilon_x$, $\epsilon_y$, $\epsilon_z$) represents strain in the directions (x, y, z), and ($\sigma_x$, $\sigma_y$, $\sigma_z$) represents stress in the directions (x, y, z). In this embodiment, stress $\sigma_x$ and $\sigma_z$ in the x-direction and in the z-direction on the in-plane of the substrate are regarded to be $\sigma_x = \sigma_z$.

$$\delta n_x = -\frac{1}{2}n^3(p_{11}\varepsilon_x + p_{12}\varepsilon_y + p_{12}\varepsilon_z) \tag{4-1}$$

$$\delta n_y = -\frac{1}{2}n^3(p_{11}\varepsilon_y + p_{12}\varepsilon_x + p_{12}\varepsilon_z) \tag{4-2}$$

In general, further, a change $\delta n$ in the refractive index based on the photoelastic effect due to thermal stress is represented by the formulas (4-1) and (4-2) by using a photoelastic constant $P_{ij}$, refractive index n and strain $\epsilon$. In the formulas (4-1) and (4-2), ($\delta n_x$, $\delta n_y$) represents a change in the refractive index in the directions (x, y) due to the photoelastic effect.

Further, if the formulas (3-1) to (3-3) are substituted for the formulas (4-1) and (4-2), then, $\delta n_x$ and $\delta n_y$ are expressed by the formulas (5-1) and (5-2).

$$\delta n_x = -\frac{n^3}{2E}\{\sigma_x(p_{11}(1-v)+(1-3v)p_{12})+\sigma_y(-vp_{11}+(1-v)p_{12})\} \quad (5\text{-}1)$$

$$= -\frac{n^3}{2E}\{\sigma_x u_{xx}+\sigma_y u_{xy}\}$$

$$\delta n_y = -\frac{n^3}{2E}\{\sigma_x(-p_{11}2v+p_{12}2(1-v))+\sigma_y(p_{11}-2vp_{12})\} \quad (5\text{-}2)$$

$$= -\frac{n^3}{2E}\{\sigma_x u_{yx}+\sigma_y u_{yy}\}$$

Here, $u_{xx}$, $u_{xy}$, $u_{yx}$ and $u_{yy}$ are as given below.

$$u_{xx} = p_{11}(1-v)+(1-3v)p_{12} \quad (5\text{-}3)$$

$$u_{xy} = -vp_{11}+(1-v)p_{12} \quad (5\text{-}4)$$

$$u_{yx} = -p_{11}2v+p_{12}2(1-v) \quad (5\text{-}5)$$

$$u_{yy} = (p_{11}-2vp_{12}) \quad (5\text{-}6)$$

The formulas (5-1) and (5-2) represent a relationship between a change δn in the refractive index and the thermal stress a due to the photoelastic effect. By substituting the formulas (1-1) to (1-4) for the formulas (5-1) and (5-2), there is found a difference Δn in the refractive index between the core layer 2 and the upper clad layer 3. If the difference Δn in the refractive index in the x-direction is denoted by $\Delta n_x$, the difference Δn in the refractive index in the y-direction is denoted by $\Delta n_y$ and if a constant θ is defined as given by the formula (6-3), then, the difference $\Delta n_x$ in the refractive index is expressed by the formula (6-1) and the difference $\Delta n_y$ in the refractive index is expressed by the formula (6-2).

$$\Delta n_x = \delta n_{x\_core} - \delta n_{x\_clad} \quad (6\text{-}1)$$

$$= -\frac{n^3}{2E}[(\sigma_{x\_core}u_{xx}+\sigma_{y\_core}u_{yx})-(\sigma_{x\_clad}u_{xx}+\sigma_{y\_clad}u_{yx})]$$

$$= \frac{n^3}{2(1-v)}\begin{bmatrix}-u_{xx}(\alpha_{core}\Delta T_{core}-\alpha_{subs}\Delta T_{core}-\alpha_{clad}\Delta T_{clad}+\\ \alpha_{subs}\Delta T_{clad})-u_{yx}2(\alpha_{core}-\alpha_{clad})\Delta T_{clad}\end{bmatrix}$$

$$= \theta\begin{bmatrix}\Delta T_{core}(-u_{xx}\alpha_{core}+u_{xx}\alpha_{subs})+\Delta T_{clad}\\(-2u_{xy}\alpha_{core}+2u_{xy}\alpha_{clad}-u_{xx}\alpha_{subs}+u_{xx}\alpha_{clad})\end{bmatrix}$$

$$\Delta n_y = \delta n_{y\_core} - \delta n_{y\_clad} \quad (6\text{-}2)$$

$$= -\frac{n^3}{2E}[(\sigma_{x\_core}u_{xy}+\sigma_{y\_core}u_{yy})-(\sigma_{x\_clad}u_{xy}+\sigma_{y\_clad}u_{yy})]$$

$$= \frac{n^3}{2(1-v)}\begin{bmatrix}-u_{yx}(\alpha_{core}\Delta T_{core}-\alpha_{subs}\Delta T_{core}-\alpha_{clad}\Delta T_{clad}+\\ \alpha_{subs}\Delta T_{clad})-u_{yy}2(\alpha_{core}-\alpha_{clad})\Delta T_{clad}\end{bmatrix}$$

$$= \theta\begin{bmatrix}\Delta T_{core}(-u_{yx}\alpha_{core}+u_{yx}\alpha_{subs})+\Delta T_{clad}\\(-2u_{yy}\alpha_{core}+2u_{yy}\alpha_{clad}-u_{yx}\alpha_{subs}+u_{yx}\alpha_{clad})\end{bmatrix}$$

$$\theta = \frac{n^3}{2(1-v)} \quad (6\text{-}3)$$

Here, in the formulas (6-1) and (6-2), $\delta n_{x\_core}$ and $\delta n_{y\_core}$ represent changes in the refractive index in the x-direction and in the y-direction of the core layer 2 due to the photoelastic effect, and $\delta n_{x\_clad}$ and $\delta n_{y\_clad}$ represent changes in the refractive index in the x-direction and in the y-direction of the upper clad layer 3 due to the photoelastic effect.

From the formulas (5-3) to (5-6), further, there are obtained the formulas (7-1) and (7-2).

$$u_{xx}-u_{yx} = (1+v)(p_{11}-p_{12}) \quad (7\text{-}1)$$
$$= c$$

$$u_{xy}-u_{yy} = (1+v)(-p_{11}+p_{12}) \quad (7\text{-}2)$$
$$= -c$$

From the formulas (6-1), (6-2), (7-1) and (7-2), a difference between the difference $\Delta n_x$ in the refractive index in the x-direction and the difference $\Delta n_y$ in the refractive index in the y-direction, can be expressed by the formula (8-1).

$$\Delta n_x - \Delta n_y = (\delta n_{x\_core}-\delta n_{x\_clad})-(\delta n_{y\_core}-\delta n_{y\_clad})$$
$$= c\theta[\Delta T_{core}(-\alpha_{core}+\alpha_{subs})+\Delta T_{clad}(2\alpha_{core}-\alpha_{subs}-\alpha_{clad})] \quad (8\text{-}1)$$

In order that the optical waveguide does not have polarization dependence, the difference $\Delta n_x$ in the refractive index in the x-direction should be set to be equal to the difference $\Delta n_y$ in the refractive index in the y-direction. By setting the right-hand side of the formula (8-1) to be 0, therefore, the formula can be rearranged as given by the formula (9-1).

$$\frac{\Delta T_{core}}{\Delta T_{clad}} = \frac{2\alpha_{core}-\alpha_{subs}-\alpha_{clad}}{\alpha_{core}-\alpha_{subs}} \quad (9\text{-}1)$$

The formula (9-1) represents a relationship of coefficients of linear expansion of the core layer 2, the upper clad layer 3 and the composite substrate 6 by taking the softening temperatures $T_{core}$ and $T_{clad}$ of the core layer 2 and the upper clad layer 3 into consideration. Upon adjusting the compositions of the core layer 2 and the upper clad layer 3 so as to satisfy the formula (9-1), there is manufactured an optical waveguide which does not have polarization dependence. If the formula (9-1) is rearranged assuming that $\Delta T_{core}=\Delta T_{clad}$, then, $\alpha_{core}=\alpha_{clad}$. This represents the technologies of JP-A-1-169406 and JP-A-5-257021 which try to lower the polarization dependence by equalizing the coefficients of linear expansion of the core layer 2 and the upper clad layer 3 only without taking the softening temperatures $T_{core}$ and $T_{clad}$ of the core layer 2 and the upper clad layer 3 into consideration.

EXAMPLE

Example will now be concretely described. First, in order to find a temperature difference ΔT between the normal temperature and the softening temperature, a silica glass film was formed on a silicon substrate by using a plasma CVD method. There were formed two kinds of silica glass films, the first one being a silica glass film (GSG) to which germanium has been added and the second one being a silica glass film (BPSG) to which phosphorus and boron have been added. A starting tetraethoxyorthosilicate (TEOS) liquid was used as a silica component common to the two kinds of glass films. Tetramethoxygermanium (TMG) was used as a dopant material for GSG, and tetramethoxyboron (TMB) and tetramethoxyphosphorus (TMP) were used as dopant materials for BPSG. The glass films were formed maintaining a thickness of 5 μm and were heat-treated at 1100° C. for 24 hours.

The temperature change (temperature difference) ΔT was calculated from the internal stress estimated from the warping amount of the substrate. A relationship between the internal stress and the birefringence can be found from the formulas (5-1) and (5-2). The silica glass film was formed on the whole surface of the silicon substrate and, hence, $\sigma_y=0$. Therefore, assuming that $\sigma_y=0$ in the formulas (5-1) and (5-2), the birefringence is expressed by the formula (10-1).

$$\delta n_x - \delta n_y = -\frac{n^3}{2E}\sigma_x(u_{xx} - u_{yx}) \quad (10\text{-}1)$$
$$= -\frac{n^3}{2E}\sigma_x(1+v)(p_{11} - p_{12})$$

The samples were prepared for confirming the collation and matching to the birefringence found from the internal stress, and were measured for their indexes of refraction. The birefringence was measured by using a prism coupler (wavelength is 1.55 μm) for the waves polarized in both a direction in parallel with the film surface (TE mode) and a direction perpendicular to the film surface (TM mode). Then, the birefringence is found from the differences between the refractive indexes $n_{TE}$ in the TE mode and the refractive indexes $n_{TM}$ in the TM mode. Table 2 shows the measured results of the samples.

Figure 2:
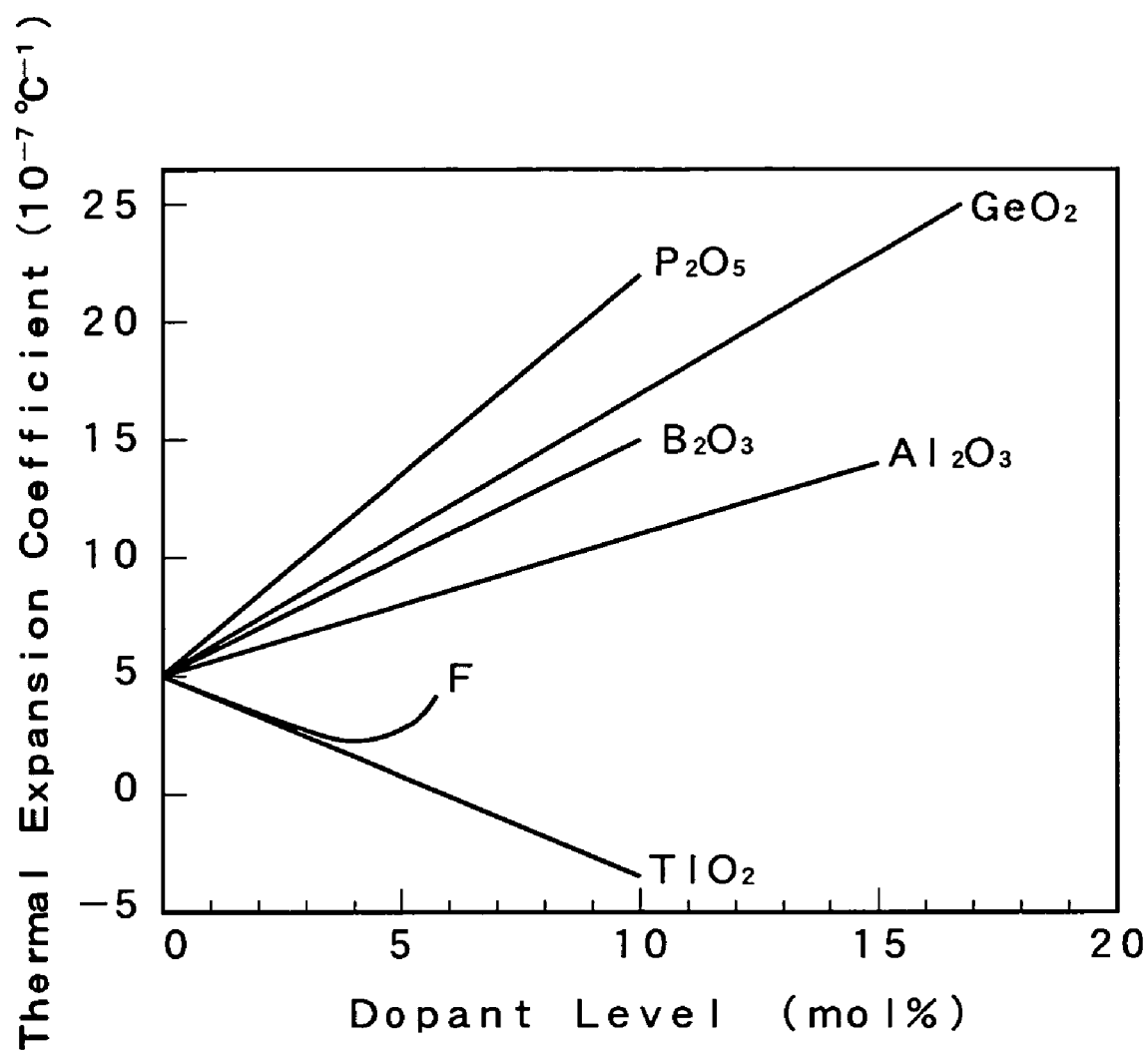
FIG. 2 is a diagram illustrating a relationship between the coefficient of linear expansion of a silica glass film and the concentration of dopant.

The internal stress of the film was found by measuring the warping amount of the substrate, and by substituting the warping amount and the value of Table 1 for the formula (11-1). In the formula (11-1), R is a radius of curvature, t is a thickness of the film, d is a thickness of the silicon substrate, E is a Young's modulus of the film formed on the substrate, and v is a Poisson's ratio of the film formed on the substrate. The coefficients of linear expansion of the silica glass films shown in Table 1 were estimated from the data shown in FIG. 2 and from the dopant concentrations measured by other experiment.

TABLE 1

$$\sigma = \frac{Et^2}{6(1-v)Rd} \quad (11\text{-}1)$$

| Parameter | Value |
| --- | --- |
| Young's modulus of Si (Pa) | $11 \times 10^{10}$ |
| Young's modulus of NSG (Pa) | $7.3 \times 10^{10}$ |
| Poisson's ratio of Si and NSG | 0.17 |
| Coefficient $\alpha_{Si}$ of linear expansion of Si | $30 \times 10^{-7}$ |
| Coefficient $\alpha_{BPSG}$ of linear expansion of BPSG | $9 \times 10^{-7}$ |
| Coefficient $\alpha_{GSG}$ of linear expansion of GSG | $11 \times 10^{-7}$ |
| Coefficient $\alpha_{NSG}$ of linear expansion of NSG | $5 \times 10^{-7}$ |

The difference ΔT between the practically used temperature (normal temperature) and the softening temperature is found from the formula (12-1). In the formula (12-1), however, $\alpha_f$ is a coefficient of linear expansion of the film formed on the substrate, and the Young's modulus E and the Poisson's ratio v are those of the film. Table 2 shows the measured results of the samples and the calculated results.

TABLE 2

$$\sigma = \frac{E}{1-v}(\alpha_f - \alpha_{Si})\Delta T \quad (12\text{-}1)$$

| Sample | $n_{TE} - n_{TM}$ | Film stress (MPa) | ΔT(° C.) |
| --- | --- | --- | --- |
| GSG | $8.2 \times 10^{-4}$ | 230 | 900 |
| BPSG | $3.0 \times 10^{-4}$ | 83 | 300 |

In the process for manufacturing the optical waveguide, the heat treatment is conducted after the film has been formed in order to decrease the insertion loss of the optical waveguide. When the temperature of the heat treatment is higher than the softening temperature, the thermal stress accumulates in a temperature range lower than the softening temperature when the temperature is decreasing.

When the softening temperature is not taken into consideration, it is considered that ΔT of GSG and ΔT of BPSG are both about 1000° C. which is nearly equal to the heat-treating temperature. If the coefficients of linear expansion shown in Table 1 and ΔT=1000° C. are substituted for the formula (12-1), then, the film stress of GSG becomes 250 MPa and the film stress of BPSG becomes 278 MPa. The film stress of GSG is nearly in agreement with the measured value shown in Table 2, but the film stress of BPSG greatly differs from the measured value shown in Table 2. On the other hand, if the measured film stress shown in Table 2 and ΔT=1000° C. are substituted for the formula (12-1) to find the coefficients of linear expansion of GSG and BPSG, respectively, then, the coefficient of linear expansion of GSG becomes $13 \times 10^{-7}$ and the coefficient of linear expansion of BPSG becomes $24 \times 10^{-7}$. The coefficient of linear expansion of GSG is within a range of errors but the coefficient of linear expansion of BPSG greatly differs from the value shown in Table 1.

As for the softening temperatures, GSG and BPSG have different softening temperatures, and their differences ΔT need not be equalized. Accordingly, there is no problem even if the differences ΔT found by substituting the film stress shown in Table 2 and the coefficient of linear expansion shown in Table 1 for the formula (12-1) are different between GSG and BPSG. As shown in Table 2, ΔT of GSG is calculated to be 900° C. and ΔT of BPSG is calculated to be 300° C. Here, from a relationship between the dopant concentration of a general glass and the softening temperature, the softening temperature of GSG can be calculated to be 800 to 1100° C. and the softening temperature of BPSG can be calculated to be 300 to 600° C. The differences ΔT shown in Table 2 calculated from the measured values are nearly in agreement with the softening temperatures calculated from the relationship between the dopant concentration of a general glass and the softening temperature. It is, therefore, considered that the differences ΔT shown in Table 2 are the differences between the practically used temperature and the softening temperature.

In a real device of the optical waveguide as represented by the formulas (1-1) to (1-4), the thermal stress is produced by ΔT ($=\Delta T_{core}$) of the core layer and by ΔT ($=\Delta T_{clad}$) of the upper clad layer. As represented by the formulas (6-1) and (6-2), further, the birefringence is produced by $\Delta T_{core}$ and $\Delta T_{clad}$. If the coefficients of linear expansion shown in Table 1 as well as $\Delta T_{core}=900°$ C. of GSG and $\Delta T_{clad}=300°$ C. of BPSG obtained above are substituted for the formula (8-1), then, $\Delta n_x - \Delta n_y$ becomes $1.0 \times 10^{-4}$, and it is expected that even the optical waveguide without interference system has polarization dependence.

Next, an optical waveguide of a structure illustrated in FIGS. 1A and 1B was manufactured to verify the polarization dependence. The optical waveguide uses GSG as a material of the core layer 2 and BPSG as a material of the upper clad layer 3. Further, the optical waveguide uses a silica glass film (NSG) without dopant as a material of the lower clad layer 4. The optical waveguide further uses a silica glass as the substrate 5. A lower NSG clad layer 4 of 3 μm was formed on the silica glass substrate 5 and, then, a GSG core layer 2 of 7 μm was formed thereon. A tungsten silicide film of 1 μm was formed as an etching mask for forming a waveguide pattern and, then, a photoresist was applied, exposed to light and developed by the ordinary photolithography method to form a waveguide pattern of the resist. Then, the waveguide core layer 2 was patterned into a predetermined shape by the reactive ion etching (RIE). The heat treatment was conducted at 1100° C. for 3 hours and, then, BPSG of 30 μm was deposited to form the upper clad layer 3 followed by the heat treatment at 1100° C. for 24 hours. After the wafer process has been finished, the wafer was cut and the surface was polished to produce an optical waveguide chip.

The optical waveguide devices were used as a directional coupler and as a 1×8 branched power splitter, and were evaluated for their differences in the characteristics in their TE mode and TM mode. As for a relationship of coefficients of linear expansion among the core layer 2, upper clad layer 3 and composite substrate 6 constituting the optical waveguide, $\Delta T_{core}$=900° C. of GSG and $\Delta T_{clad}$=300° C. of BPSG obtained above were substituted for the formula (9-1) to obtain the formula (13-1).

$$\alpha_{core} + \alpha_{clad} - 2\alpha_{subs} = 0 \quad (13\text{-}1)$$

The formula (13-1) is a conditional formula of when the polarization dependence of the optical waveguide of this embodiment is reduced to zero. There were prepared a waveguide optimizing the concentrations of germanium, boron and phosphorus such that the compositions of the core layer 2, the upper clad layer 3 and the composite substrate 6 satisfied the formula (13-1), and an optical waveguide without optimizing the concentrations. These optical waveguides were evaluated for their polarization dependence. In the above two optical waveguides, the process elements were all the same except the composition. In this composition, too, the ratio of $\Delta T_{core}$ and $\Delta T_{clad}$ was not almost different from the results of the embodiment 1 as was verified by another experiment.

The directional coupler was measured for its polarization dependent loss (PDL) occurring due to a difference (branching ratio) between the through-port output and the cross-port output. The 1×8 branched splitter, on the other hand, was measured for its PDL at the 8-port outputs, and an average value thereof was found. The source of light emitted light of a wavelength of 1.55 μm.

TABLE 3

| | Before optimized (dB) | After optimized (dB) |
|---|---|---|
| Directional coupler | 0.9 | 0.3 |
| Splitter | 0.6 | 0.1 |

As shown in Table 3, the optical waveguide optimizing the compositions of the core layer 2, upper clad layer 3 and composite substrate 6 in accordance with the formula (13-1) of the embodiment, has substantially low polarization dependence.

Figure 3:
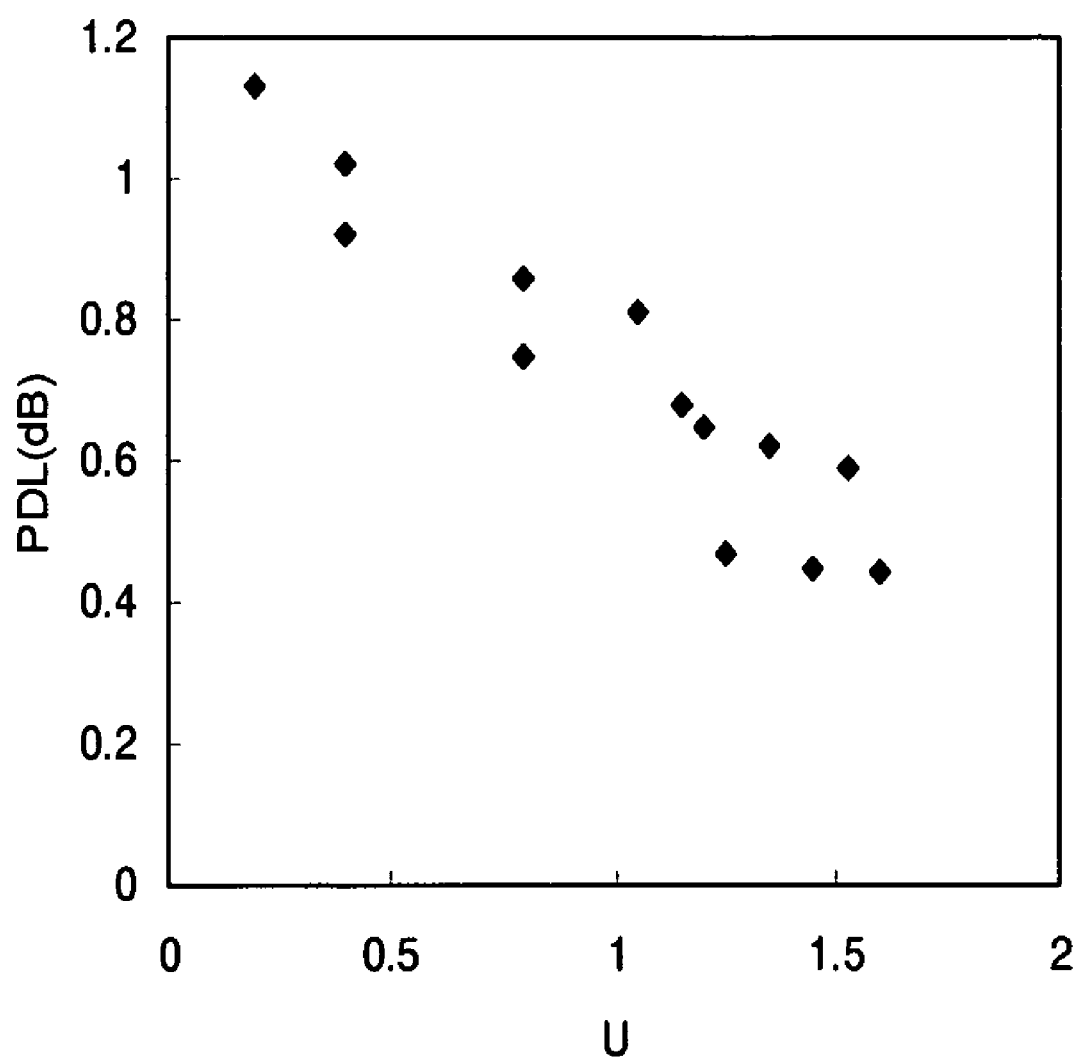
FIG. 3 is a diagram illustrating a relationship between the values U found by the right side of a formula (9-1) while varying the coefficient α of linear expansion of a core layer 2 and the values PDL measured by using a directional coupler.

Further, the constitutions having the portions of varying coefficients α of linear expansion were calculated for their values U given by the right-hand side of the formula (9-1) to examine a relationship relative to the measured PDL of the directional coupler. FIG. 3 shows a relationship between the values U and the measured values of PDL of the directional coupler, wherein the abscissa represents the values U and the ordinate represents the measured values (dB) of PDL. As shown in FIG. 3, the PDL decreases with an increase in the value U. When the coefficient α of linear expansion of the core layer 2 has a value shown in Table 1, U is 0.8 and the measured value of PDL is 0.9 dB as shown in Table 3. When U>1, however, PDL<0.6 dB, and the optical waveguide has low polarization dependence.

As described above, the invention makes it possible to improve an optical waveguide which has low polarization dependence.

What is claimed is:

1. An optical waveguide comprising:
   a lower clad layer formed on a substrate;
   a core layer formed on the lower clad layer; and
   an upper clad layer in which the core layer is buried;
   wherein at least the core layer and the upper clad layer are made of a material comprising a glass as a major component;
   wherein a coefficient of linear expansion of the core layer is denoted by $\alpha_{core}$, a difference between a softening temperature $T_{core}$ of the core layer and a practically used temperature $T_o$ by $\Delta T_{core}$, a coefficient of linear expansion of the upper clad layer by $\alpha_{clad}$, a difference between a softening temperature $T_{clad}$ of the upper clad layer and the practically used temperature $T_o$ by $\Delta T_{clad}$, and a coefficient of effective linear expansion of the substrate and of the lower clad layer by $\alpha_{subs}$, then, a relationship, $$\frac{\Delta T_{core}}{\Delta T_{clad}} = \frac{2\alpha_{core} - \alpha_{subs} - \alpha_{clad}}{\alpha_{core} - \alpha_{subs}}$$

is satisfied.

2. An optical waveguide according to claim 1, further having a relationship $\Delta T_{core} > \Delta T_{clad}$.

3. An optical waveguide according to claim 1, further having a relationship, $$\frac{2\alpha_{core} - \alpha_{subs} - \alpha_{clad}}{\alpha_{core} - \alpha_{subs}} > 1.$$

4. An optical waveguide according to claim 2, further having a relationship, $$\frac{2\alpha_{core} - \alpha_{subs} - \alpha_{clad}}{\alpha_{core} - \alpha_{subs}} > 1.$$

* * * * *